United States Patent
Chatterjee et al.

(10) Patent No.: US 10,244,021 B2
(45) Date of Patent: Mar. 26, 2019

(54) MEDIA CONTENT AND USER EXPERIENCE DELIVERY SYSTEM

(71) Applicant: Harman International Industries, Inc., Stamford, CT (US)

(72) Inventors: Dibyendu Chatterjee, Bangalore (IN); Ramana Rao Pandeshwar, Tempe, AZ (US)

(73) Assignee: Harman International Industries, Inc., Stamford, CT (US)

( * ) Notice: Subject to any disclaimer, the term of this patent is extended or adjusted under 35 U.S.C. 154(b) by 628 days.

(21) Appl. No.: 14/099,136

(22) Filed: Dec. 6, 2013

(65) Prior Publication Data

US 2015/0163266 A1    Jun. 11, 2015

(51) Int. Cl.

| | |
|---|---|
| *G06F 15/167* | (2006.01) |
| *H04L 29/06* | (2006.01) |
| *H04N 21/436* | (2011.01) |
| *H04N 21/443* | (2011.01) |
| *H04N 21/41* | (2011.01) |
| *H04N 21/43* | (2011.01) |

(52) U.S. Cl.
CPC .......... *H04L 65/60* (2013.01); *H04L 65/4084* (2013.01); *H04N 21/4122* (2013.01); *H04N 21/4307* (2013.01); *H04N 21/43615* (2013.01); *H04N 21/4433* (2013.01)

(58) Field of Classification Search
CPC .......... G06F 17/30749; H04N 21/4307; H04N 5/06; H04N 21/4122; H04N 21/4433; H04N 21/43615; H04L 65/4084; H04L 65/60
USPC ............................................. 725/80; 348/521
See application file for complete search history.

(56) References Cited

U.S. PATENT DOCUMENTS

| | | | |
|---|---|---|---|
| 7,257,158 B1 * | 8/2007 | Figueredo .............. | H04N 19/70 375/240.01 |
| 2006/0123080 A1 | 6/2006 | Baudino et al. | |

(Continued)

FOREIGN PATENT DOCUMENTS

| | | |
|---|---|---|
| CN | 2909748 Y | 6/2007 |
| CN | 102665099 A | 9/2012 |

(Continued)

OTHER PUBLICATIONS

European Search Report for corresponding Application No. 14196452.8, dated Apr. 21, 2015, 5 pages.

*Primary Examiner* — Chris Parry
*Assistant Examiner* — Stephen J Houlihan
(74) *Attorney, Agent, or Firm* — Brooks Kushman P.C.

(57) ABSTRACT

An apparatus for delivering media content from a first media device to a second media device is provided. The apparatus includes a server configured to receive media content from a first media device and to receive a first plurality of user experience settings used at the first media device to playback the media content. The server is further configured to store operating capabilities from a second media device. The server is further configured to adjust at least a portion of the operating capabilities in response to the first plurality of user experience settings to generate translated user experience settings and to transmit the media content and the translated user experience settings to the second media device to enable the second media device being to playback the media content substantially similar to the first media device playing back the media content.

18 Claims, 2 Drawing Sheets

(56) References Cited

U.S. PATENT DOCUMENTS

| | | | |
|---|---|---|---|
| 2008/0016532 A1* | 1/2008 | Wang | H04N 5/4401 |
| | | | 725/45 |
| 2008/0208908 A1 | 8/2008 | Kashyap et al. | |
| 2009/0119273 A1* | 5/2009 | Nagasaka | G06F 17/3074 |
| 2009/0313553 A1 | 12/2009 | Thornton et al. | |
| 2010/0146567 A1* | 6/2010 | Mehta | H04N 7/17318 |
| | | | 725/91 |
| 2010/0241967 A1* | 9/2010 | Lee | H04N 21/4104 |
| | | | 715/744 |
| 2012/0189140 A1* | 7/2012 | Hughes | H04M 3/56 |
| | | | 381/123 |
| 2013/0179535 A1 | 7/2013 | Baalu et al. | |
| 2014/0012913 A1* | 1/2014 | Varoglu | H04W 76/023 |
| | | | 709/204 |
| 2014/0129630 A1* | 5/2014 | Nikain | H04N 21/8133 |
| | | | 709/204 |
| 2014/0218461 A1* | 8/2014 | DeLand | H04L 12/1813 |
| | | | 348/14.07 |
| 2014/0277639 A1* | 9/2014 | Gomes-Casseres | G06F 17/00 |
| | | | 700/94 |
| 2014/0280879 A1* | 9/2014 | Skolicki | H04L 69/28 |
| | | | 709/224 |

FOREIGN PATENT DOCUMENTS

| | | |
|---|---|---|
| CN | 102685579 A | 9/2012 |
| CN | 103248611 A | 8/2013 |

* cited by examiner

MEDIA CONTENT AND USER EXPERIENCE DELIVERY SYSTEM

TECHNICAL FIELD

Aspects disclosed herein generally related to a media ("audio and/or video") content and a user experience delivery system.

BACKGROUND

A system for providing multimedia content between a plurality of user terminals is set forth in U.S. Publication No. 2009/0313553 ("the '553 application"). The '553 application discloses that a first multimedia presentation on a first user terminal is selected by a first user. Data corresponding to the first multimedia presentation is then transmitted to a second user terminal. Data is received corresponding to a second multimedia presentation from the second user terminal by the first user terminal. The first multimedia presentation or the second multimedia presentation is then displayed on the first user terminal and the second user terminal based on, respectively, a first profile of the first user terminal and a second profile of the second user terminal.

SUMMARY

In one embodiment, an apparatus for delivering media content from a first media device to a second media device is provided. The apparatus includes a server configured to receive media content from a first media device and to receive a first plurality of user experience settings used at the first media device to playback the media content. The server is further configured to store a plurality of operating capabilities from a second media device. The server is further configured to adjust at least a portion of the plurality of operating capabilities in response to the first plurality of user experience settings to generate translated user experience settings and to transmit the media content and the translated user experience settings to the second media device to enable the second media device to playback the media content substantially similar to the first media device playing back the media content.

In another embodiment, a computer-program product embodied in a non-transitory computer readable medium that is programmed for delivering media content from a first media device to a second media device is provided. The computer-program product comprising instructions for receiving media content from a first media device and for receiving a first plurality of user experience settings used at the first media device to playback the media content. The computer-program product comprising instructions for storing a plurality of operating capabilities from a second media device. The computer-program product comprising instructions for adjusting at least a portion of the plurality of operating capabilities in response to the first plurality of user experience settings to generate translated user experience settings and for transmitting the media content and the translated user experience settings to the second media device to enable the second media device to playback the media content substantially similar to the first media device playing back the media content.

In another embodiment, a method for delivering video content from a first media device to a second media device is provided. The method comprises receiving video content from a first media device and receiving a first plurality of user experience settings used at the first media device to playback the video content. The method further comprises storing a plurality of operating capabilities from a second media device. The method further comprises adjusting at least a portion of the plurality of operating capabilities in response to the first plurality of user experience settings to generate translated user experience settings and transmitting the video content and the translated user experience settings to the second media device to enable the second media device to playback the video content substantially similar to the first media device playing back the video content.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
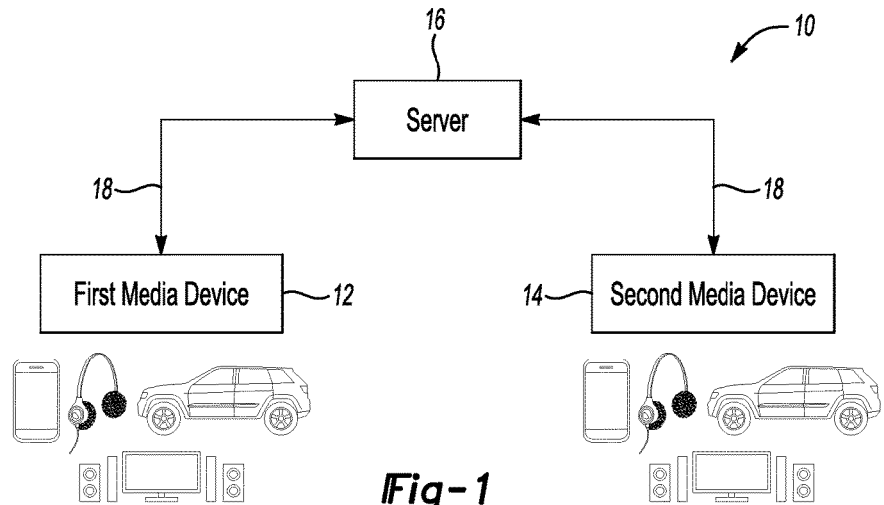
FIG. 1 depicts a system for delivering media content and user experience settings related to the media content in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

An aggregation and delivery system for providing media (or "audio and/or video") content in addition to user experience settings related to such media content is provided. Such data is transmitted or shared between at least two media devices. Conventional systems aggregate or share media contents from a first media device with a second media device. However, in this case, the actual settings (e.g., user experience settings) used by the first media device (e.g., sharing media device) to generate the audio/video contents of interest by the second user are not shared or transmitted to the second media device (e.g., consuming media device) such that the second media device is capable not only of reproducing the audio content, but reproducing the media content with the user experience settings used by the first media device.

The system as disclosed herein generally aggregates the media content along with the user experience settings (e.g., audio user experience settings and/or video user experience settings) of the media content as established in the first media device and shares and delivers the media content and the user experience settings to the second media device (e.g., consuming media device). Various audio user experience parameters may include equalizer settings, delay settings, surround sound info, volume settings, loudness, bass settings, treble settings, midrange settings, frequency response of speakers as not all speakers can produce all frequencies of sound, etc. Various video user experience settings may include contrast, saturation, ambience, light, color balance, brightness, etc.

A server or other suitable mechanism modifies the user experience settings as received from the first media device according to the capabilities of the second media device such that the second media device is capable of playing back the media content. This not only helps in sharing the media content, but also helps in sharing the user experience. Prior to the server modifying the user experience settings, the first media device and the second media device provide a listing of their respective audio and/or video operating capabilities to the server. For example, the first media device and the second media device may be different devices and may not have similar operating capabilities. The different audio operating capabilities may include settings such as output power, volume/bass/treble/loudness/midrange settings and/or frequency responses from different speakers. The different video operating capabilities may include settings such as contrast, saturation, ambience, light, color, balance and brightness settings.

FIG. 1 depicts a system 10 for delivering media content and user experience settings related to the media content in accordance to one embodiment. The system 10 generally includes a first media device 12, a second media device 14, and a server 16. In general, the first media device 12 may be any type of device that is generally situated to transmit (or playback) audio data and/or video data based on various user experience settings as noted above. In one example, the first media device 12 and the second media device 14 may include any one of a home theatre system, a portable device (e.g., a cell phone), a set of headphones, an in-vehicle infotainment system, etc.

A server (or computer) 16 is electrically coupled to the first media device 12 and the second media device 14. A communication link 18 is provided to enable bi-directional communication between the first media device 12, the second media device 14, and the server 16. The communication link 18 may be a Transmission Control Protocol/Internet Protocol (TCP/IP), Bluetooth® link or other suitable bus/link generally situated to facilitate data communication between two or more computers (or electronic devices).

In general, a user may control or set various user experience settings associated with the first audio device 12 to playback the media content in a format that is appealing to the user. The user may then share the media content as played back in accordance the user experience settings as established on the first media device 12 with the second media device 14 for consumption. For example, the first media device 12 may transmit the media content and the user experience settings to the server 16. The server 16 in turn, may translate the user experience settings as received from the first media device 12 into a format that is suitable to enable the second media device 14 to playback the media content in accordance to the user experience settings used in the first media device 12.

It is recognized that the first media device 12 and the second media device 14 may be different from one another (e.g., first media device 12 is a home theatre system and second media device 14 is a cell phone). In this case, the server 16 may translate the various user experience settings as provided from the home theatre system into translated user experience settings for use on the cell phone. The cell phone may be modified in accordance to the translated user experience settings and playback the audio content on the headphones to replicate the transmitted or shared audio content and the user experience settings.

More specifically, consider the example in which the user enjoys the use of a 5.1 surround sound experience and staging/distance effect as provided by the home theatre system and desires to have his/her cell phone and headphones replicate the same. The server 16 receives the user experience settings from the home theatre system and creates a translation of the same to transmit to the cell phone. For example, the server 16 determines the manner in which a digital signal processor (DSP) as used in the cell phone needs to be revised in order to replicate the 5.1 surround sound experience and the staging/distance effect with the headphone. In particular, the server 16 generates a set of translated user experience settings that are indicative of the manner in which the DSP in the cell phone is to be modified for replicating the user experience settings as provided by the first media device 12. The server 16 transmits the set of translated user experience settings to the cell phone (in addition to the media content) such that the cell phone adjusts its DSP in accordance to the set of translated user experience settings to playback the media data in the manner played back by the home theatre system. In general, the server 16 is arranged to determine which level of parameters associated with the cell phone can provide a similar experience to those provided by the home theatre system.

In yet another example, the home theatre system (i.e., the first media device 12) may provide audio content to a head phone based portable audio system (i.e., the second media device 14). In this case, the home theatre system provides the audio content in addition to various user experience settings such as bass settings, treble settings, delay parameters, etc. to the server 16. The server 16 then translates the user experience settings such as the bass setting and treble setting associated with the home theatre system to a corresponding bass and treble setting that is suitable for the head phone based portable audio system to play back the audio content at a similar user experience to that experienced on the home theatre system. In this case, the server 16 receives information related to the settings/capabilities of each of the home theatre system and the headphone based portable audio system prior to the sharing of the audio content and the user experience settings. Based on this information, the server 16 will not transmit the delay settings as provided in the user experience settings associated with the home theatre system as the server 16 has knowledge that the other device that will receive the audio content and user experience parameter is the head phone based portable audio system and that the user of the head phones of the portable audio system is located in between the speakers of the head phones. Thus, the delay parameters of the home theatre system are not needed for the head phone portable audio system. For example, speakers used in connection with the home theatre system will be placed inside a room. In some cases, the speakers may not be positioned in an ideal position and/or the user in the room may not be centered with respect to the speakers. To account for this condition, speaker delays may be used in the home theatre system. However, in the case of headphones, the user is placed in-between two speakers. Accordingly, there is no need for the server 16 to provide the speaker delay to the headphone portable audio system.

In the above example, the second media device 14 is able to playback the audio content associated with the bass and treble settings as used by the first media device 12 except for the speaker delay parameters. However, the audio played back by the second media device 14 will be similar in experience to the first media device 12 since the speaker delay parameters are used by the first media device 12 to ensure that the user is centered in-between the speakers. Again, this condition is not necessary for the headphone (or second media device 14).

Prior to the server 16 translating the user experience settings; the first media device 12, the second media device 14, and the server 16 undergo a series of handshake operations such that the server 16 understands the audio and/or video operating capabilities associated with each of the first media device 12 and the second media device 14. This enables the server 16 to provide the translated user experience settings to the second media device 14 so that a comparable or relative user experience is achieved with respect to the first media device 12. The handshaking operation as performed between the first media device 12, the second media device and the server 16 will be discussed in more detail below.

Figure 2:
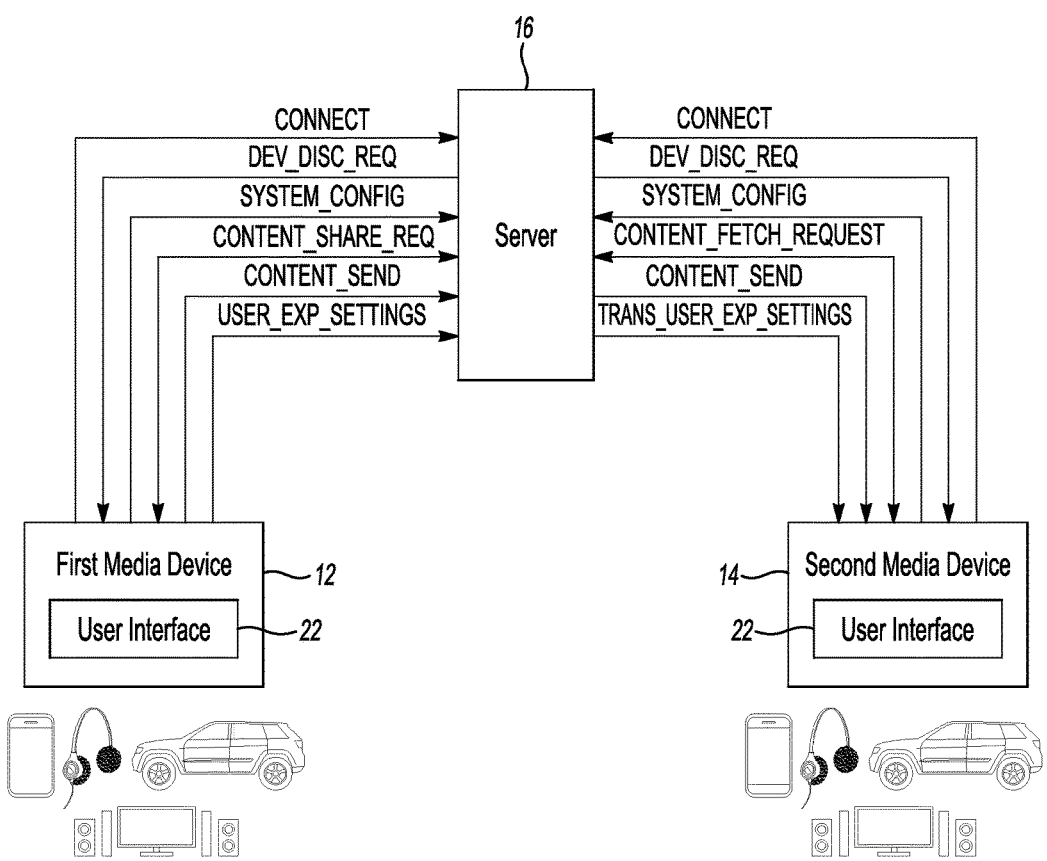
FIG. 2 depicts a more detailed implementation of the system for delivering media content and the user experience settings related to the media content in accordance to one embodiment.

FIG. 2 depicts a more detailed implementation of the system 10 for delivering the user experience settings related to the media content in accordance to one embodiment. Each of the first media device 12 and the second media device 14 undergo a handshaking operation with the server 16. This operation enables the server 16 to determine the media (or audio and/or video) operating capabilities or the listing of settings supported on first media device 12 and the second media device 14. The server 16 may then translate the user experience settings as received from the first media device 12 into translated user experience settings that is suitable to modify the affected settings of the second media device 14 to playback the media content with a generally similar or relative user experience as provided by the first media device 12. The server 16 then transmits the translated user experience settings to the second media device 14. The second media device 14 may then modify its settings in accordance to those identified in the translated user experience settings. Once the parameters (or settings) of the second media device 14 have been modified, the second media device 14 outputs the media content at a user experience that is similar (or comparable) to those as provided in the first media device 12.

In a handshake mode, the first media device 12 transmits a signal CONNECT to the server 16. The signal CONNECT indicates to the server 16 that the first media device 12 is connected thereto. The server 16 then transmits a signal DEV_DISC_REQ (or device discovery request) over the communication link 18. The signal DEV_DISC_REQ prompts the first media device 12 to provide information related to its various audio and/or video parameters (i.e., types of settings that the first media device 12 is capable of supporting (e.g., audio parameters such as equalizer settings, delay settings, surround sound info, volume settings, loudness, bass settings, treble settings, midrange settings, frequency response of speakers and video parameters such as contrast, saturation, ambience, light, color balance, brightness, etc.)). In response to the signal DEV_DISC_REQ, the first media device 12 transmits a signal SYSTEM_CONFIG which identifies the operating capabilities of the first media device 12 to the server 16. The server 16 stores such information in memory thereof. The server 16 may include a look up table (LUT) (not shown) for storing identification information that identifies the first media device 12 in addition to the audio/video operating capabilities for the first media device 12.

The above process as noted above in connection with the first media device 12 with respect to the handshake mode also applies to the second media device 14. For example, the second media device 14 transmits a signal CONNECT to the server 16. The signal CONNECT indicates to the server 16 that the second media device 14 is connected thereto. The server 16 then transmits a signal DEV_DISC_REQ (or device discovery request) over the communication link 18 back to the second media device 14. The signal DEV_DISC_REQ prompts the second media device 14 to provide information related to its various operating capabilities (i.e., the type of settings that the first media device 12 is capable of supporting ((e.g., audio parameters such as equalizer settings, delay settings, surround sound info, volume settings, loudness, bass settings, treble settings, midrange settings, frequency response of speakers, etc. and video parameters such as contrast, saturation, ambience, light, color, balance, brightness, etc.)). In response to the signal DEV_DISC_REQ, the second media device 14 transmits a signal SYSTEM_CONFIG which identifies the audio/video operating capabilities of the second media device 14 to the server 16. The server 16 stores such information in memory thereof. The LUT stores identification information that identifies the second media device 14 in addition to the audio/video operating capabilities for the second media device 14.

In a media content share mode, the first media device 12 may transmit a signal CONTENT_SHARE_REQ to the server 16 to notify the server 16 that the media content from the first media device 12 is to be shared or provided to the second media device 14. The CONTENT_SHARE_REQ provides identification information as to which device 12 provides the media content and the user experience settings and identification information as to which device 14 will receive the media content and the user experience settings from the first media device 12. It is recognized that two or more media devices may be coupled to the server 16. Alternatively, the second media device 14 may transmit a signal CONTENT_FETCH_REQ to the server 16 to prompt the server 16 to initiate a request with the first media device 12 to share its media content. The CONTENT_SHARE_REQ provides identification information as to which device 12, 14 receives the media content and the user experience settings from the first media device 12.

The first media device 12 transmits the media content on a signal CONTENT_SEND to the server 16. Additionally, the first media device 12 transmits the user experience settings (e.g., the settings that it is currently using to play back the media content on the first media device 12) on a signal USER_EXP_SETTINGS to the server 16. The server 16 reviews the user experience settings and determines the manner in which the second media device 14 can reproduce the media content based on the user experience settings as employed at the first media device 12.

The server 16 generates translated user experience settings which take into account the manner in which the second media device 14 can be modified to playback the media content provided from the first media device 12. The server 16 transmits the translated user experience settings on a signal TRAN_USER_EXP_SETTINGS to the second media device 14. The second media device 14 modifies its settings internally to play back the media content (as provided by the first media device 12) in accordance to the translated user experience settings. The second media device 14 then plays back the media content at user experience settings that are similar to those employed at the first media device 12.

While FIG. 2 illustrates that first audio device 12 shares media content and user experience settings with the second audio device 14, it is recognized that the second audio device 14 may also share its corresponding media content and user experience settings with the first audio device 12. In this case, the second audio device 14 may transmit the signals CONTENT_SHARE_REQ, CONTENT_SEND and USER_EXP_SETTINGS (this aspect is not shown in FIG. 2). Conversely, the first audio device 12 may transmit the signal CONTENT_FETCH_REQUEST and may receive the signals CONTENT_SEND and TRANS_USER_EXP_SETTINGS (this aspect is not shown in FIG. 2). It is further recognized that the any media device that is electrically coupled to the server 16 generally undergoes a handshake operation therewith in order to communicate the various types of operating capabilities or the type of settings that each of the various media devices are capable of supporting.

Each media device 12, 14 includes a user interface 22 for enabling a user to initiate sharing the media content and the user experience settings that are employed thereof for generating the media content. The user can also select which device 12 or 14 will receive the media content in addition to the user experience settings via the user interface 22. Prior to the device 12 or 14 engaging in the transfer of the media content and the user experience settings to the server 16, the sharing media device and the consuming media device are required to undergo the handshake operation with the server 16 so that the audio/video operating capabilities for each device 12, 14 is provided to the server 16. The server 16 may request that each media device 12, 14 provide its corresponding audio/video operating capabilities upon the server 16 detecting that each media device 12, 14 is electrically connected thereto. Alternatively, or in addition to, a user can select an option via the user interface to control the media device 12, 14 to provide the audio/video operating capabilities to the server 16.

The user interface 22 may also be used by the user to adjust various settings of the shared media content as provided by the sharing media device 12, 14. For example, consider the first media device 12 sharing video content to the second media device 14. If brightness of the screen on the first media device 12 is low due to the ambience light being low (e.g., the ambience light for the room in which the first media device 12 is low), the server 16 may prompt the user of the second media device via the user interface 22 as to whether the second media device 14 would like to playback the shared video content at a higher brightness value. The second media device 14 may be positioned in a room that is well lit when compared to the first media device 12.

In general, the server 16 may be configured to instruct the first media device 12 and/or the second media device 14 to provide selectable setting options that adjusts various settings of the shared media content. For example, the server 16 may detect that the settings used for playing back the video and/or audio content are out of range (or are at a maximum or minimum level)(see example above regarding brightness setting being too low for the shared video content at the second media device 14). In this case, the server 16 may then instruct the second media device 14 to provide an option for the user to select to adjust the brightness to a higher level if desired. If the user increases the brightness setting, the second media device 14 transmits a signal corresponding to the increased brightness value back to the server 16. The server 16 in turn, will transmit the shared video content at the selected setting. Alternatively, the second media device 14 may simply playback the video content at the selected setting after user such a setting is input into the user interface 22.

Figure 3:
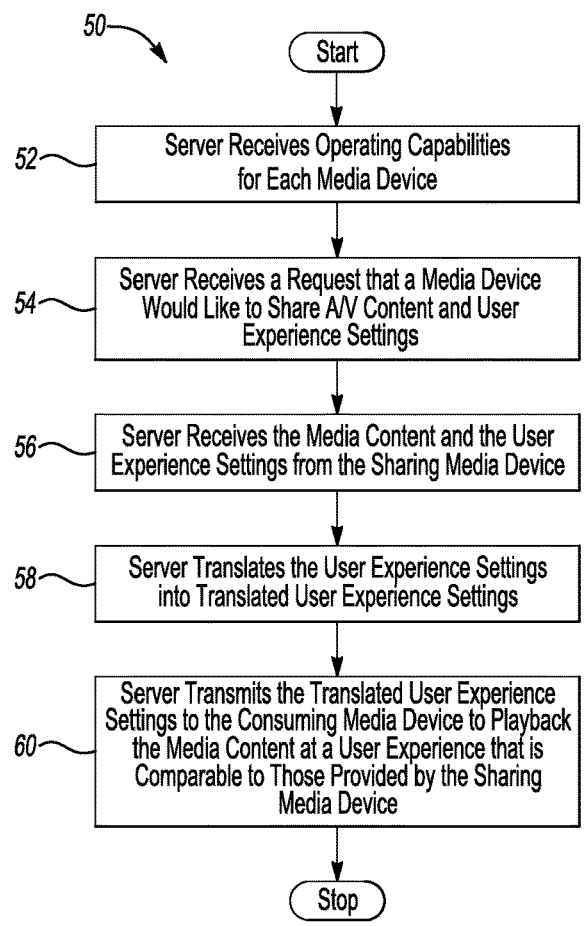
FIG. 3 depicts a method for delivering the media content and the user experience settings related to the media content in accordance to one embodiment.

FIG. 3 depicts a method 50 for delivering the media content and the user experience settings related to the media content in accordance to one embodiment.

In operation 52, the server 16 receives corresponding audio/video operating capabilities for each media device 12, 14 in the handshake mode. In general, this may be performed every time the media device 12, 14 establishes contact with the server 16. For example, it is possible for a corresponding media device 12, 14 to have any one or more of their respective operating capabilities modified through various software and/or hardware updates (e.g., a new app is downloaded which impacts any equalizer settings, delay settings, surround sound info, volume settings, loudness, bass settings, treble settings, midrange settings, frequency response of speakers as not all speakers can produce all frequencies of sound, etc.). As the end user may have various options for modifying the functionality of the media device 12, 14 via such updates, it is advantageous for the media device 12, 14 to perform the handshake operation with the server 16 every time an electrical connection is established with the server 16.

In operation 54, the server 16 may receive a request from either media device 12, 14 to share its corresponding media content and user experience settings that are employed for playing back the media content.

In operation 56, the server 16 receives the media content and the user experience settings from the sharing media device 12, 14.

In operation 58, the server 16 translates the user experience settings being provided by the sharing media device 12, 14 into translated user experience settings for the consuming media device 12, 14. The server 16 generally includes an electronic database. The electronic database includes previously generated and stored information corresponding to the manner in which the settings for the receiving (or consuming) media device can be modified or adjusted based on the settings used at the sharing media device to playback the media content that is relative or comparable to that played back at the sharing media device. Such information is accessed by the server 16 when it is desired to translate the user experience settings for the first media device 12 into settings for the second media device 14.

In operation 60, the server 16 transmits the translated user experience settings to the consuming media device 12, 14 to playback the media content at a user experience that is generally comparable to the manner in which the sharing media device 12,14 plays back the media content.

Figure 4:
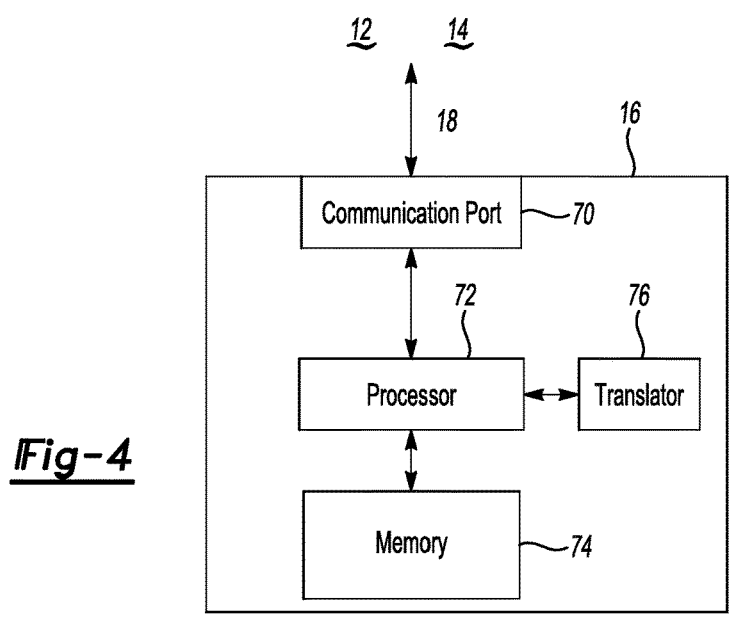
FIG. 4 depicts a server for receiving the media content and user experience settings related to the media content in accordance to one embodiment.

FIG. 4 depicts a more detailed view of the server 16 in accordance to one embodiment. The server 16 generally includes a communication port 70 and a controller (or processor 72). The communication port 70 is coupled to the communication link 18 for transmitting and receiving signals (see signal exchange in FIG. 2) to and from the media devices 12, 14. In one example, the communication port 70 may be an internet port for supporting communication with the media devices 12, 14 via TCP/IP. In another example, the communication port 70 may be a Bluetooth® transceiver for supporting communication with the media devices 12, 14 via a Bluetooth® protocol. The server 16 also generally includes memory 74 and a translator 76. The memory 74 and that translator 76 are each operably coupled to the processor 72.

As noted above, the server 16 is configured to receive the various audio operating capabilities (e.g., equalizer settings, delay settings, surround sound info, volume settings, loudness, bass settings, treble settings, midrange settings, frequency response of speakers as not all speakers can produce all frequencies of sound) and/or video operating capabilities (e.g., contrast, saturation, ambience, light, color balance, brightness) for each media device 12, 14. It is recognized that each media device 12, 14 may have different audio/video operating capabilities with one another. The processor 72 creates or stores an ID for each media device 12, 14 that provides the user (audio and/or video) parameters in the memory 74 during the handshake mode. The processor 72 may also store the corresponding media content that is desired to be shared to the consuming media device 12. In the event, the first media device 12 is controlled to share its media content and corresponding user experience settings with the second media device 14 (or vice versa), the processor 72 transmits the corresponding user experience settings that are used to generate the media content at the first media device 12 to the translator 76. The translator 76 in turn, translates the user experience settings into the translated user experience settings.

The memory 74 provides the various audio/video operating capabilities for the second media device 14 to the translator 76. The translator 76 compares the user experience settings (or settings) used at the first media device 12 to the settings of the second media device 14 to determine the manner as to how to adjust the settings of the second media device 14 to enable the second media device 14 to playback the media content at a level that is comparable to that of the first media device 12. The translator 76 includes an electronic database that includes a translation index for each type of media device that can be used by a user. For example, an administrator of the server 16 may populate the electronic database with particulars for the settings of the sharing media device 12,14 and corresponding conversion of the settings for receiving media device 12,14 which enable the receiving media device 12, 14 to playback the media content to be similar to that played back at the sharing media device. This allows the translator 76 to perform the translation.

Specifically, the administrator of the server 16 may populate the electronic database with any number of media devices including the type (e.g., cell phone, home theatre system, television, etc.) and the manufacturer (Apple®, Sony®, Hitachi®, etc.) and corresponding set of settings. Based on the media device type and manufacturer, the administrator of the server 16 may also previously generate or store the particulars for the manner in which to translate the settings for one media device into settings for another media device based on the type and manufacturer of the media device. This operation may be performed periodically to account for new products (media devices) on the market. This operation is generally performed prior to receiving the operating capabilities of the first media device 12 and the second media device 14. It is also recognized that various manufacturers of the media devices may also provide or upload information related to their corresponding devices and settings to the server 16. The server 16 may automatically store such information in the electronic database. In the event, the database does not include information corresponding to the media device 12, 14 and/or corresponding operating capabilities, the server 16 may indicate to both devices 12, 14 that it is not able to support sharing media content.

The translator 76 provides the translated user experience settings to the processor 72 which indicate to the second media device 14 the manner in which it is required to modify its settings to playback the media content at the user experience employed at the first media device 12. The processor 72 transmits the media content along with the translated user experience settings over the communication link 18 to the second media device 14. The second media device 14 then modifies its audio and/or video settings in accordance to those as specified in the translated user experience settings.

Consider the example as noted above in which the user enjoys the use of a 5.1 surround sound experience and staging/distance effect as provided by the home theatre system and desires to have his/her cell phone and headphones replicate the same. In this case, the server 16 receives the user experience settings used by the first media device 12 (or the home theatre system) to produce the 5.1 surround sound experience and staging/distance effect. The type (e.g., home theatre system) and manufacturer information of the home theatre system in addition to the user experience settings used by the home theatre system to provide the media content is transmitted from the memory 74 to the translator 76. Likewise, the operating capabilities, (e.g., type, manufacturer, and settings) of the second media device 14 (or the cell phone) are transmitted from the memory 74 to the translator 76. The translator 76 locates the corresponding type and manufacturer of the home theatre system in addition to the corresponding user experience settings (e.g., DSP settings) used by the home theatre system to playback the media content which ultimately provides the 5.1 surround sound experience and staging/distance effect. The translator 76 also locates the corresponding type and manufacturer of the cell phone in addition to its corresponding settings (e.g., DSP settings) in the electronic database. The translator 76 locates the manner in which the DSP settings of the cell phone are to be modified or translated based on the DSP settings of the home theatre system. The manner in which the DSP settings of the cell phone are to be translated based on the DSP settings of the home theatre system are previously established or stored in the electronic database (i.e., in the translator 76) by the administrator of the server 16. This information is transmitted by the server 16 as the translated user experience settings to the server 16. The cell phone then adjusts its DSP settings based on the translated user experience setting to playback the media content to achieve the 5.1 surround sound experience and staging/distance effect as provided by the home theatre system.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for delivering media content from a first media device to a second media device, the apparatus comprising:
a server configured to:
receive media content from a first media device;
receive a first plurality of user experience settings used at the first media device to playback the media content;
store a plurality of operating capabilities for a second media device;
modify at least a portion of the plurality of operating capabilities of the second media device on the server in response to the first plurality of user experience settings to generate translated user experience settings; and
transmit the media content and the translated user experience settings to the second media device to modify affected settings of the second media device with the translated user experience settings to enable the second media device to playback the media content substantially similar to the first media device playing back the media content;
wherein the server is further configured to store the plurality of operating capabilities of the second media device to determine audio related settings of the plurality of operating capabilities of the second media device prior to transmitting the first media content and the translated user experience settings to the second media device.

2. The apparatus of claim 1 wherein the server is further configured to receive a first signal indicative of a media content share request from one of the first media device and the second media device prior to adjusting the at least the portion of the plurality of operating capabilities.

3. The apparatus of claim 2 wherein the server is further configured to adjust the least a portion of the plurality of operating capabilities after receiving the first signal.

4. The apparatus of claim 1 wherein the server is further configured to receive the first plurality of user experience settings from the first media device to determine audio related settings and video related settings of the first media device.

5. The apparatus of claim 4 wherein the server includes memory for storing (i) an identification for the first media device and (ii) the audio related settings and video related settings of the first media device.

6. The apparatus of claim 1 wherein the server includes memory for storing (i) an identification for the second media device and (ii) the audio related settings and video related settings of the second media device.

7. The apparatus of claim 1 wherein the translated user experience settings correspond to modified audio related settings indicative of at least one of modified equalizer settings, modified speaker delay settings, modified surround sound information, modified loudness settings, modified bass settings, modified treble settings, modified midrange settings, or a modified frequency response of a speaker.

8. The apparatus of claim 7 wherein the translated user experience settings further correspond to modified video related settings indicative of a modified contrast, a modified saturation, a modified ambiance, a modified light, a modified color, a modified balance, and a modified brightness.

9. The apparatus of claim 1, wherein the audio related settings of the plurality of operating capabilities of the second media device correspond to at least one of equalizer settings, speaker delay settings, surround sound information, loudness settings, bass settings, treble settings, midrange settings, or a frequency response of a speaker.

10. A computer-program product embodied in a non-transitory computer readable medium that is programmed for delivering media content from a first media device to a second media device, the computer-program product comprising instructions for:
receiving media content from a first media device;
receiving a first plurality of user experience settings used at the first media device to playback the media content;
storing a plurality of operating capabilities for a second media device;
modifying at least a portion of the plurality of operating capabilities of the second media device in response to the first plurality of user experience settings to generate translated user experience settings; and
transmitting the media content and the translated user experience settings to the second media device to modify affected settings of the second media device with the translated user experience settings to enable the second media device to playback the media content substantially similar to the first media device playing back the media content;
wherein storing the plurality of operating capabilities for the second media device includes storing the plurality operating capabilities for the second media device to determine audio related settings of the plurality of operating capabilities of the second media device prior to transmitting the first media content and the translated user experience settings to the second media device.

11. The computer-program product of claim 10 further comprising instructions for receiving a first signal indicative of a media content share request from one of the first media device and the second media device prior to adjusting the at least the portion of the plurality of operating capabilities.

12. The computer-program product of claim 11 further comprising instructions for adjusting the least a portion of the plurality of operating capabilities after receiving the first signal.

13. The computer-program product of claim 10 further comprising instructions for receiving the first plurality of user experience settings from the first media device to determine audio related settings and video related settings of the first media device.

14. The computer-program product of claim 13 further comprising instructions for storing (i) an identification for the first media device and (ii) the audio related settings and the video related settings of the first media device.

15. The computer-program product of claim 10 further comprising instructions for storing (i) an identification for the second media device and (ii) the audio related settings and video related settings of the second media device.

16. The computer-program product of claim 10, wherein the audio related settings of the plurality of operating capabilities of the second media device correspond to at least one of equalizer settings, speaker delay settings, surround sound information, loudness settings, bass settings, treble settings, midrange settings, or a frequency response of a speaker.

17. The computer-program product of claim 10, wherein the translated user experience settings correspond to modified audio related settings indicative of at least one of modified equalizer settings, modified speaker delay settings, modified surround sound information, modified loudness settings, modified bass settings, modified treble settings, modified midrange settings, or a modified frequency response of a speaker.

18. The computer-program product of claim 10, wherein the translated user experience settings further correspond to modified video related settings indicative of a modified contrast, a modified saturation, a modified ambiance, a modified light, a modified color, a modified balance, and a modified brightness.

* * * * *